US011098817B1

(12) United States Patent
Eddleman et al.

(10) Patent No.: US 11,098,817 B1
(45) Date of Patent: Aug. 24, 2021

(54) MAGNETICALLY DAMPED PASSIVE VALVE

(71) Applicant: United States of America as represented by the Administrator of NASA, Washington, DC (US)

(72) Inventors: David E. Eddleman, Cullman, AL (US); James A. Richard, Grant, AL (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 115 days.

(21) Appl. No.: 16/688,264

(22) Filed: Nov. 19, 2019

(51) Int. Cl.
| | | |
|---|---|---|
| *F16K 31/08* | (2006.01) | |
| *F16K 47/00* | (2006.01) | |
| *F04B 53/10* | (2006.01) | |
| *F16K 15/06* | (2006.01) | |
| *F04B 39/10* | (2006.01) | |
| *F16K 15/02* | (2006.01) | |

(52) U.S. Cl.
CPC .............. *F16K 31/08* (2013.01); *F16K 47/00* (2013.01); *F04B 39/1013* (2013.01); *F04B 53/1082* (2013.01); *F16K 15/026* (2013.01); *F16K 15/063* (2013.01); *F16K 31/084* (2013.01); *F16K 31/086* (2013.01)

(58) Field of Classification Search
CPC ...... F16K 31/08; F16K 47/00; F04B 39/1013; F04B 53/1082
See application file for complete search history.

(56) References Cited

U.S. PATENT DOCUMENTS

| | | | | |
|---|---|---|---|---|
| 160,869 | A * | 3/1875 | Bowers | F16K 47/00 137/514.3 |
| 1,105,255 | A * | 7/1914 | Caskey | F16K 47/00 137/514.3 |
| 1,768,582 | A * | 7/1930 | Dougherty | F16K 47/00 251/323 |

(Continued)

OTHER PUBLICATIONS

"Electrodynamics of a Magnet Moving Through a Conducting Pipe", Department of Physics and Astronomy, California State University, Feb. 2, 2008, by M. Hossein Partovi and Eliza J. Morris.

*Primary Examiner* — Umashankar Venkatesan
(74) *Attorney, Agent, or Firm* — James J. McGroary; Helen M. Galus

(57) ABSTRACT

A magnetically damped check valve having a non-magnetic metal sleeve and a spring-biased poppet disposed within the check valve. The spring-biased poppet is operably supported by the sleeve. A poppet guide is attached to the sleeve. The poppet includes a shaft that is slidably attached to the poppet guide. A portion of the shaft extends into the sleeve. At least one magnet is attached to the portion of the shaft that extends into the sleeve. The magnet therefore moves with the shaft as the poppet moves in response to changes in differential pressure across the check valve. The magnet produces a magnetic field. As the magnet moves within the sleeve, the magnetic field changes thereby inducing an electrical current in the sleeve which produces another magnetic field that opposes the magnetic field of the magnet thereby damping the movement of the magnet and hence, damping the movement of the poppet.

28 Claims, 4 Drawing Sheets

(56) References Cited

U.S. PATENT DOCUMENTS

| | | | | |
|---|---|---|---|---|
| 2,679,353 A | * | 5/1954 | Bernat | F04B 39/1013 |
| | | | | 417/504 |
| 2,939,475 A | | 6/1960 | Roach | |
| 2,949,931 A | * | 8/1960 | Ruppright | F16K 15/02 |
| | | | | 137/528 |
| 3,026,903 A | | 3/1962 | Roach | |
| 3,072,144 A | * | 1/1963 | Cassell | F16K 47/00 |
| | | | | 137/514.5 |
| 4,257,452 A | * | 3/1981 | Hill | F16K 17/30 |
| | | | | 137/514.7 |
| 4,275,758 A | | 6/1981 | Masuda | |
| 4,488,702 A | | 12/1984 | Lapeyre | |
| 4,693,270 A | * | 9/1987 | Yaindl | F16J 15/062 |
| | | | | 137/514.3 |
| 5,232,013 A | * | 8/1993 | Morris | F16K 15/063 |
| | | | | 137/514.7 |
| 5,240,036 A | * | 8/1993 | Morris | F16K 15/063 |
| | | | | 137/514 |
| 5,320,136 A | | 6/1994 | Morris | |
| 5,771,884 A | | 6/1998 | Yarnall | |
| 6,443,182 B1 | * | 9/2002 | Hathcock | F16K 15/063 |
| | | | | 137/514.5 |
| 8,671,975 B2 | | 3/2014 | Charlton | |
| 9,200,648 B2 | | 12/2015 | Lumkes | |
| 2010/0024891 A1 | * | 2/2010 | Francini | F16K 15/026 |
| | | | | 137/14 |
| 2020/0041024 A1 | * | 2/2020 | Ito | F16K 7/17 |

* cited by examiner

MAGNETICALLY DAMPED PASSIVE VALVE

ORIGIN OF THE INVENTION

The invention described herein was made by employees of the United States Government and may be manufactured and used by or for the Government of the United States of America for governmental purposes without the payment of any royalties thereon or therefor.

CROSS-REFERENCES TO RELATED PATENT APPLICATIONS

None.

FIELD OF THE INVENTION

The present invention relates to a magnetically damped passive valve.

BACKGROUND

Passive valves, such as check valves, are found in many industrial, aerospace and military applications where dependable operation, under demanding conditions, is critical. Check valves are commonly found in propulsion systems. Check valves are typically designed to have a size suitable to handle the largest fluid flow in a system. However, very often, the actual fluid low is of much lower magnitude. For example, a propulsion system requires a high flow purge at engine shutoff but yet only requires a "trickle" purge for most other operational needs. Check valves have an internal port or seat through which the fluid flows and a poppet, ball or flapper that covers the seat to block flow in the reverse direction. In a check valve that utilizes a poppet or ball, fluid flow in the desired (forward) direction pushes the poppet or ball open when the differential pressure across the valve is sufficient to overcome the forces restraining the poppet or ball. Check valves typically use a spring to return the poppet or ball to the seated (blocking) position when there is no differential pressure. If the check valve utilizes a flapper, a differential pressure created by the downstream fluid pressure being greater than the upstream fluid pressure will keep the flapper closed. When the upstream pressure exceeds the downstream pressure, the flapper opens and fluid flows in the forward direction.

Referring to FIG. 1, there is shown a cross-sectional view of prior art check valve 10 that utilizes a poppet. Check valve 10 has valve body 12 which includes sections 12A and 12B. Check valve 10 also has inlet fitting 14 and outlet fitting 16. Spring 20 applies a force to poppet 22 which maintains poppet 22 in the closed position when there is a low differential pressure across check valve 10. When in the closed position, poppet 22 contacts O-ring seal 23. An increase in upstream pressure 24 causes an increase in the differential pressure across check valve 10. As the differential pressure increases, the pressure on the poppet area, known as the "poppet area load", increases to the point where the poppet area load equals the spring force produced by spring 20. The magnitude of upstream pressure that causes the poppet area load to equal the spring force is known as the "cracking pressure". At the moment when the cracking pressure is attained, the upstream pressure and downstream pressure are balanced or are at equilibrium. As the upstream pressure reaches the cracking pressure, the poppet can become unstable. Increases in the differential pressure that are just above the cracking pressure cause the poppet to open slightly and decreases in the differential pressure that are just below the cracking pressure causes the poppet to close. Spring 20 and poppet 22 form a classic spring-mass system that is subject to harmonic oscillation caused by rapidly changing differential pressure. Such rapidly changing differential pressure causes poppet 22 to rapidly open and close such that poppet 22 "hammers" against the seal seat. This rapid oscillatory motion of poppet 22 is known as "check valve chatter". Harmonic motion (oscillations of poppet 22) sustained for long periods of time can result in accelerated wear and damage to poppet 22 and the seal seat. Oscillations at frequencies even higher than the natural frequency are common in gaseous fluid service. A check valve that ordinarily would be expected to operate for years can be ruined in a matter of hours when operating at conditions that result in such high frequency of oscillations.

One prior art technique to produce damping in check valves to reduce chatter and instability is a frictional damper. Typically, a frictional damper uses an elastomer or other material to rub against the moving parts. However, frictional dampers often wear out components and exhibit inconsistent operating characteristics due to variation in temperatures and increased operating time.

Another prior art technique to effect damping in a check valve is a fluidic damper. A fluidic damper uses a dashpot that is filled with the working fluid when the check valve is closed. However, the fluidic damper often exhibits inconsistent operation with changes in fluid properties such as density and viscosity.

What is needed is an improved check valve that addresses the problems and deficiencies of prior art check valves.

SUMMARY OF THE INVENTION

In some embodiments, the present invention is directed to a magnetically damped check valve comprising a valve body having an interior region, an interior wall extending about the interior region and fluid ports in communication with the interior region. The check valve further comprises a non-magnetic metal sleeve disposed within the interior region of the valve body and secured to the interior wall. The sleeve comprises a sleeve wall, an interior region within the sleeve wall and at least one sleeve wall opening in fluid communication with both the interior region of the valve body and the interior region of the sleeve. The check valve further comprises a poppet assembly located within the interior region of the valve body to control the flow of fluids through the check valve. The poppet assembly is operatively supported by the sleeve. The poppet assembly comprises a poppet having a poppet shaft. A portion of the poppet shaft extends into the interior region of the sleeve. The poppet is movable between a first position to prevent fluid flow through the check valve and a second position to allow fluid flow through the check valve. The poppet assembly further comprising a biasing device to constantly urge the poppet to the first position. The check valve further comprises at least one magnet attached to the portion of the poppet shaft located within the interior region of the sleeve such that the magnet moves with the poppet shaft as the poppet moves in response to changes in the differential pressure across the check valve. The magnet produces a first magnetic field that changes as the magnet moves within the interior region of the sleeve. The changes in the first magnetic field induce an electrical current in the sleeve which produces a second magnetic field that opposes the first magnetic field thereby damping the movement of the magnet and hence, damping the movement of the poppet.

In some embodiments, the present invention is directed to a check valve comprising a valve body having an interior region, an interior wall extending about the interior region, a fluid inlet in fluid communication with the interior region for receiving upstream fluids and a fluid outlet for allowing fluids in the interior region to flow downstream. The check valve further comprises a non-magnetic metal sleeve disposed within the interior region of the valve body and secured to the interior wall. The sleeve comprises a sleeve wall, an interior region within the sleeve wall and at least one sleeve wall opening in fluid communication with both the interior region of the valve body and the interior region of the sleeve. The sleeve further comprises a first end that faces the fluid inlet and has a first opening. The sleeve includes an opposite second end that faces the fluid outlet and has a second opening. The check valve further comprises a poppet assembly located within the interior region of the check valve to control fluid flow through the check valve. The poppet assembly comprises a poppet having a poppet head, a poppet shaft attached to the poppet head and a poppet guide member attached to the first end of the sleeve. The shaft of the poppet is slidably attached to the poppet guide member and the poppet guide member is configured so that a portion of the poppet shaft extends through the first opening in the first end of the sleeve and into the interior region of the sleeve. The poppet is movable between a closed position and an open position. The poppet assembly further comprises a poppet biasing device operatively supported by the poppet guide member to exert a constant force on the poppet so as to constantly urge the poppet to the closed position. At least one magnet is attached to the portion of the poppet shaft located within the interior region of the sleeve such that the magnet moves with the poppet shaft as the poppet moves in response to changes in the differential pressure across the check valve. The magnet produces a first magnetic field. As the magnet moves within the interior region of the sleeve, the first magnetic field changes. These changes in the first magnetic field induce an electrical current in the sleeve which produces a second magnetic field that opposes the first magnetic field thereby damping the movement of the magnet and hence, damping the movement of the poppet.

In some embodiments, the present invention is directed to a magnetically damped check valve, comprising a valve body having an interior region, an interior wall extending about the interior region, a fluid inlet in fluid communication with the interior region for receiving upstream fluids and a fluid outlet for allowing fluids in the interior region to flow downstream. The check valve further comprises a non-magnetic metal sleeve disposed within the interior region of the valve body and secured to the interior wall. The sleeve comprises a sleeve wall, an interior region within the sleeve wall and at least one sleeve wall opening in fluid communication with both the interior region of the valve body and the interior region of the sleeve. The sleeve has a first end that faces the fluid inlet and has a first opening. The sleeve also has an opposite second end that faces the fluid outlet and has a second opening. The check valve further comprises a poppet guide member attached to the first end of the sleeve. The poppet includes a poppet head and a shaft that is attached to the poppet head and slidably attached to the poppet guide member. The poppet guide member is configured so that a portion of the shaft extends through the first opening in the first end of the sleeve and into the interior region of the sleeve. The poppet is configured to move between a closed position to prevent fluid flow through the fluid inlet of the valve body and an open position to allow fluid to flow through the fluid inlet and into the interior region of the valve body. A biasing device is operatively supported by the poppet guide member to exert a constant force on the poppet so as to constantly urge the poppet to the closed position. When a differential pressure is created across the check valve that is a result of upstream fluid pressure exceeding downstream fluid pressure, the upstream fluid pressure exerts a force on the poppet head that overcomes the force of the biasing device and pushes the poppet to the open position to allow upstream fluid to flow into the interior region of the valve body and when a differential pressure is created across the check valve that is a result of the downstream fluid pressure exceeding the upstream fluid pressure, the downstream fluid pressure in conjunction with the biasing device moves the poppet back to the closed position. The check valve further comprises at least one magnet attached to the portion of the shaft located within the interior region of the sleeve such that the magnet moves within the interior region of the sleeve as the poppet moves in response to changes in the differential pressure across the check valve. The magnet produces a first magnetic field. As the magnet moves within the interior region of the sleeve, the first magnetic field changes thereby inducing an electrical current in the sleeve which produces a second magnetic field. The second magnetic field opposes the first magnetic field thereby damping the movement of the magnet and hence, damping the movement of the poppet.

In some embodiments, the present invention is directed to a check valve comprising an exterior, non-magnetic metal sleeve and a valve body, wherein at least a portion of the valve body is disposed within the sleeve. The valve body has an interior region, an interior wall extending about the interior region, a fluid inlet in fluid communication with the interior region for receiving upstream fluids and a fluid outlet for allowing fluids in the interior region to flow downstream. The check valve further comprises a poppet assembly located within the interior region of the valve body to control fluid flow through the check valve. The poppet assembly comprises a poppet having a poppet head, a poppet shaft attached to the poppet head and a poppet cage. The poppet cage is secured within the interior region of the valve body. The shaft of the poppet is slidably engaged with the poppet cage. The poppet is movable between a closed position and an open position. The poppet assembly further comprises a biasing device operatively supported by the poppet cage to exert a constant force on the poppet so as to constantly urge the poppet to the closed position. The check valve further includes at least one magnet attached to the poppet shaft such that the magnet moves with the poppet shaft as the poppet moves in response to changes in the differential pressure across the check valve. The magnet produces a first magnetic field. As the magnet moves within the interior region of the check valve, the first magnetic field changes thereby inducing an electrical current in the exterior, non-magnetic metal sleeve which produces a second magnetic field. The second magnetic field opposes the first magnetic field thereby damping the movement of the magnet and hence, damping the movement of the poppet.

Certain features and advantages of the present invention have been generally described in this summary section. However, additional features, advantages and embodiments are presented herein or will be apparent to one of ordinary skill of the art in view of the drawings, specification and claims hereof. Accordingly, it should be understood that the scope of the invention shall not be limited by the particular embodiments disclosed in this summary section.

DETAILED DESCRIPTION OF EXEMPLARY EMBODIMENTS OF THE INVENTION

As used herein, the terms "comprises", "comprising", "includes", "including", "has", "having" or any other variation thereof, are intended to cover a non-exclusive inclusion. For example, a process, method, article or apparatus that comprises a list of elements is not necessarily limited to only those elements, but may include other elements not expressly listed or inherent to such process, method, article or apparatus.

Approximating language, as used herein throughout the specification and claims, may be applied to modify any quantitative representation that could permissibly vary without resulting in a change in the basic function to which it is related. Accordingly, a value modified by a term such as "about" or "approximately" is not limited to the precise value specified.

Figure 1:
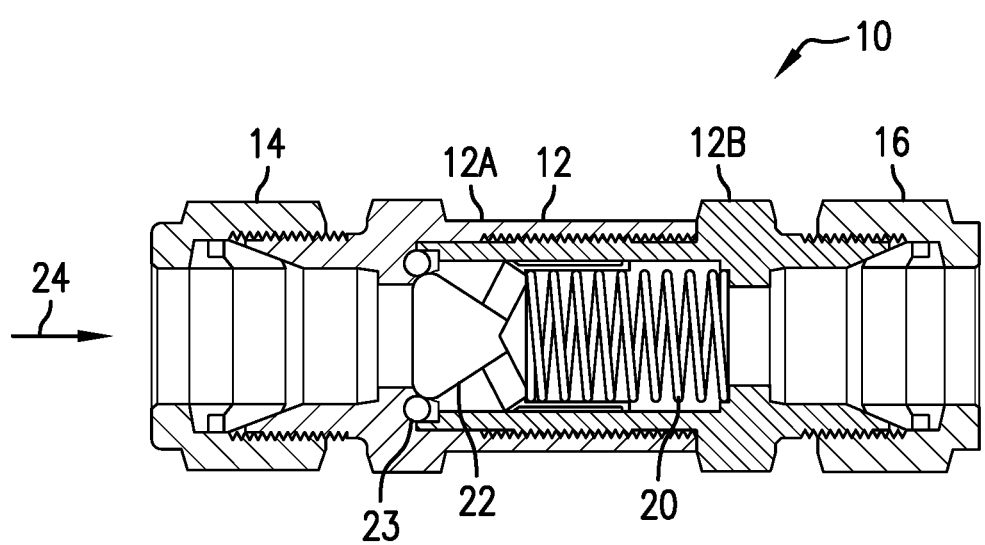
FIG. 1 is a cross-sectional view of a prior art check valve.
Figure 2:
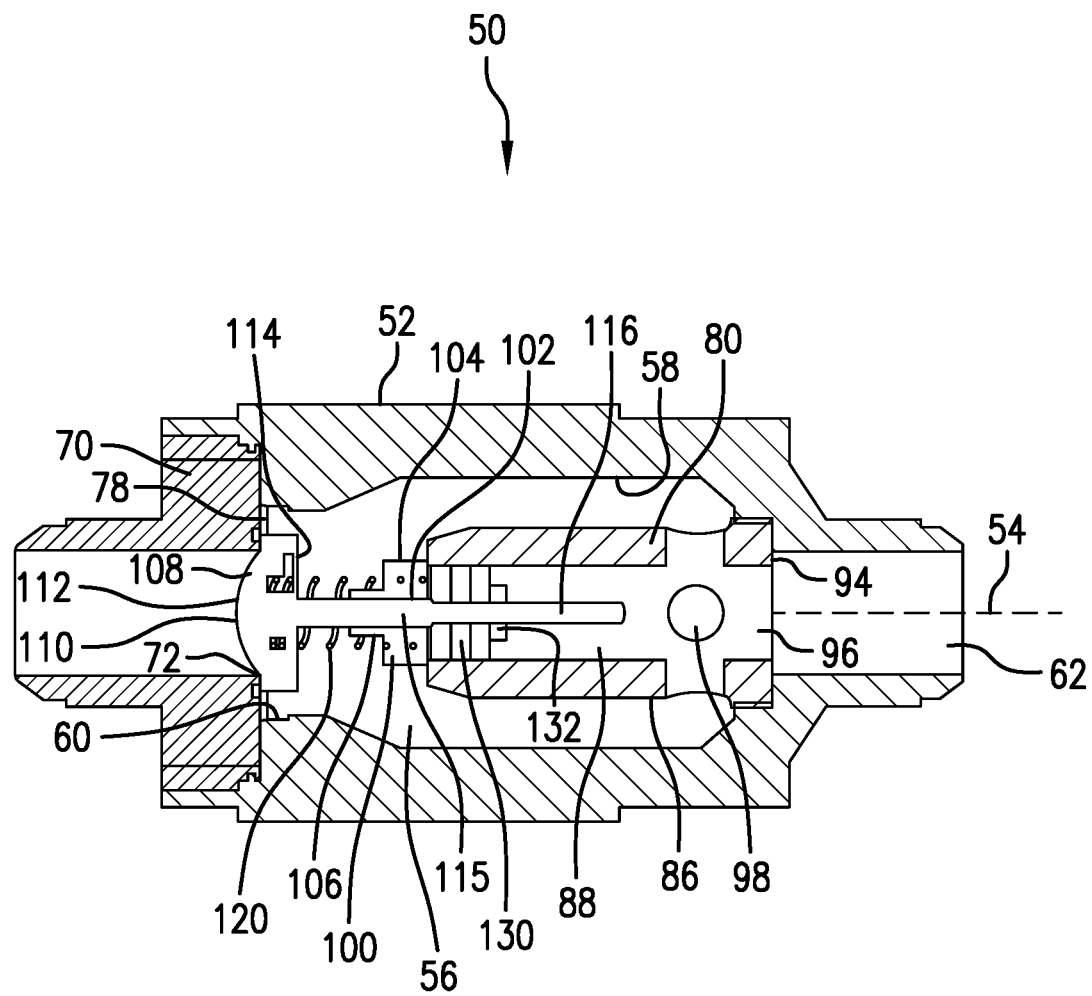
FIG. 2 is a cross-sectional view of a check valve in accordance with an exemplary embodiment of the present invention.

Referring to FIG. 2, there is shown a cross-sectional view of magnetically damped check valve 50 in accordance with an exemplary embodiment of the present invention. Check valve 50 comprises valve body 52 which has longitudinally extending axis 54, interior region 56 and interior wall 58 which surrounds interior region 56. Check valve 50 further includes fluid inlet 60 which is in fluid communication with interior region 56. Upstream fluid enters interior region 56 via fluid inlet 60 as will be described in the ensuing description. Check valve 50 further comprises fluid outlet 62 which, during use of check valve 50, is in fluid communication with downstream fluids. Check valve 50 further comprises inlet fitting 70 that is attached to valve body 52 and has fluid port 72 that is in fluid communication with fluid inlet 60 of valve body 52. Upstream fluid flows through inlet fitting 70 and exits through fluid port 72. When poppet 108, described in the ensuing description, is in the open position, the upstream fluid flows through fluid port 72 and fluid inlet 60 and into interior region 56. Inlet fitting 70 is removably attached to valve body 52. In an exemplary embodiment, inlet fitting 70 includes threads (not shown) that are threadedly engaged with a threaded surface (not shown) on interior wall 58. In an exemplary embodiment, check valve 52 includes O-ring seal 78 positioned about fluid port 72 of inlet fitting 70.

In an exemplary embodiment, check valve 50 includes an outlet fitting (not shown) that is removably attached to valve body 52 and is in fluid communication with the fluid outlet 62 of valve body 52. The outlet fitting may be removably attached to valve body 52 via any suitable technique, e.g. threads, friction fitting, welding or brazing, etc.

Figure 3:
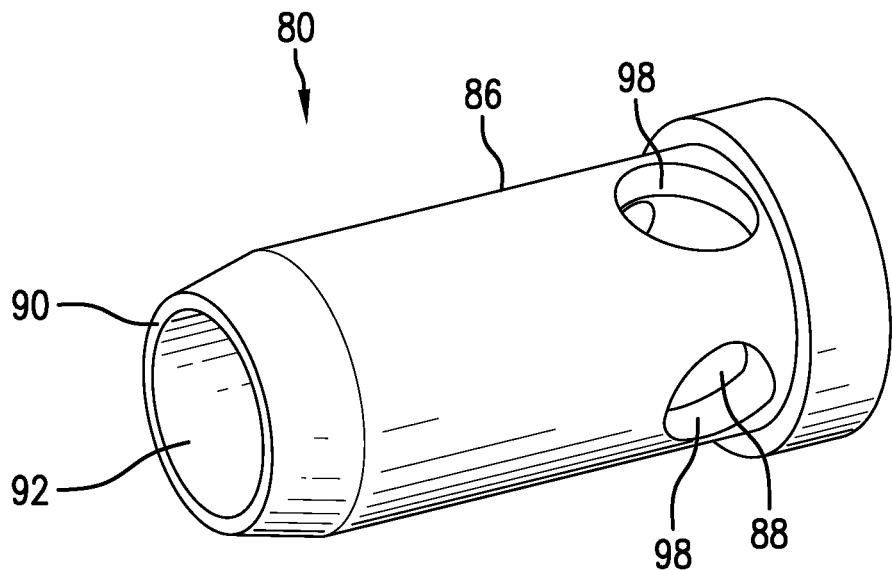
FIG. 3 is a perspective view of a sleeve shown in FIG. 2.
Figure 4:
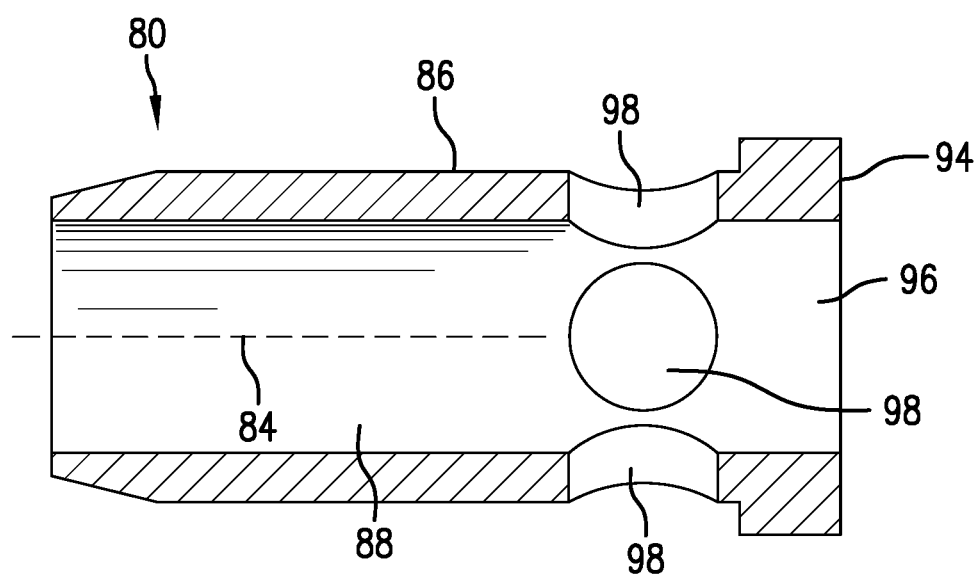
FIG. 4 is a cross-sectional view of the sleeve.

Referring to FIGS. 2, 3 and 4, check valve 50 further comprises non-magnetic metal sleeve 80 disposed within interior region 56 of valve body 52 and secured to interior wall 58. In an exemplary embodiment, sleeve 80 is threadedly attached to interior wall 58 via threads (not shown) on sleeve 80 and mating threads (not shown) on interior wall 58. However, it is to be understood that other suitable techniques may be used to attach sleeve 80 to interior wall 58. For example, in some embodiments, sleeve 80 is pressed into interior wall 58. In some embodiments, sleeve 80 is bolted to interior wall 58. In some embodiments, sleeve 80 is joined to interior wall 58 via a snap ring. Sleeve 80 includes longitudinally extending axis 84 (see FIG. 4). In some embodiments, sleeve 80 is positioned within interior region 56 of valve body 52 such that longitudinally extending axis 84 of sleeve 80 is substantially coaxial with longitudinally extending axis 54 of valve body 52. Sleeve 80 further comprises sleeve wall 86 and interior region 88 within sleeve wall 86. Sleeve 80 further includes first end 90 which has opening 92. Sleeve 80 includes opposite second end 94 that has opening 96. Opening 96 is in communication with interior region 88 and fluid outlet 62 of valve body 52. Sleeve 80 further includes at least one sleeve wall opening 98 that is in fluid communication with interior region 56 of valve body 52 and with interior region 88 of sleeve 80. In an exemplary embodiment, sleeve 80 includes a plurality of sleeve wall openings 98. In some embodiments, the sleeve wall openings 98 are equidistantly spaced. Sleeve 80 is fabricated from a non-magnetic material. In an exemplary embodiment, sleeve 80 is fabricated from copper. In another exemplary embodiment, sleeve 80 is fabricated from Aluminum. In some embodiments, sleeve 80 is fabricated from other suitable non-magnetic materials including zinc, tin, lead, nickel and chrome. In other embodiments, sleeve 80 is fabricated from alloys formed from at least two of the aforementioned non-magnetic metals. The purpose of sleeve 80 is described in detail in the ensuing description.

Referring to FIG. 2, check valve 50 further comprises a poppet assembly that includes poppet guide member 100 that is attached to first end 90 of sleeve 80 and has longitudinally extending passage 102 that is in communication with interior region 88 of sleeve 80. Poppet guide member 100 comprises base portion 104 and stem portion 106. The poppet assembly further includes poppet 108 that is located within interior region 56 of valve body 52. Poppet 108 comprises poppet head 110 which has front side 112 and rear side 114. Poppet 108 includes poppet shaft 115 which is attached to rear side 114 of poppet head 110 and is disposed through passage 102 in poppet guide member 100. Poppet shaft 115 has portion 116 that is within interior region 88 of sleeve 80. In an exemplary embodiment, passage 102 in poppet guide member 100 is substantially coaxial with longitudinally extending axis 84 of sleeve 80 such that the longitudinally extending axis of poppet shaft 115 is also substantially coaxial with longitudinally extending axis 84 of sleeve 80. Poppet 108 is configured to bi-directionally move, via linear motion, between a closed position wherein poppet head 110 closes fluid port 72 of inlet fitting 70 and an open position wherein poppet head 108 is withdrawn from fluid port 72 thereby allowing fluids to flow from fluid port 72, through fluid inlet 60 and into interior region 56 of valve body 52. When poppet 108 is in the closed position, portions of front side 112 of poppet head 110 firmly contact O-ring seal 78 that extends about fluid port 72 of inlet fitting 70. Front side 112 of poppet head 110 is referred to as the "poppet area". Pressure from upstream fluids flowing into inlet fitting 70 results in a force being exerted on the poppet area. Such force is known as the "poppet area load". Rear side 114 of poppet head 110 is subjected to pressure from downstream fluids that enter interior region 56 of valve body 52 via fluid outlet 62. As shown in FIG. 2, the poppet assembly further comprises spring member 120 that is interposed between poppet guide member 100 and poppet head 110. Stem portion 106 of poppet guide member 100 is disposed within spring member 120 to secure spring member 120 to poppet guide member 100. Spring member 120 exerts a constant force on poppet head 110 that normally urges poppet 108 to the closed position wherein poppet head 110 firmly contacts seal 78 and thus closes fluid port 72 of the inlet fitting 70.

Differential pressure is present across check valve 50 when the upstream fluid pressure is greater than the downstream fluid pressure or when the downstream fluid pressure is greater than the upstream pressure. There is no differential pressure present across check valve 50 when the upstream fluid pressure and downstream pressure are equal, or if both the upstream fluid pressure and downstream fluid pressure are zero. When a differential pressure is present across check valve 50 and is the result of the upstream fluid pressure being greater than downstream fluid pressure and this differential pressure is sufficient to produce a poppet area load that overcomes the force produced by spring member 120, spring member 120 compresses and poppet head 110 is moved away or withdrawn from fluid port 72 of inlet fitting 70 thereby allowing upstream fluid to flow around poppet head 110 and into interior region 56 of valve body 52. The fluid then flows through sleeve wall openings 98 and into interior region 88 of sleeve 80 wherein the fluid is combined and then flows through opening 96 in sleeve 80 and out through fluid outlet 62 in valve body 52. When a differential pressure is present across check valve 50 and is the result of the downstream fluid pressure being greater than upstream fluid pressure, this differential pressure results in a net force that combines with the force produced by spring member 120 to move poppet head 110 to the closed position wherein poppet head 110 firmly contacts seal 78. When no differential pressure is present across check valve 50, the force exerted by spring member 120 maintains poppet head 110 against seal 78.

Referring to FIG. 2, check valve 50 further comprises at least one magnet 130 attached to shaft portion 116 that is located within interior region 88 of sleeve 80 such that magnet 130 moves with poppet 108 as the differential pressure across check valve 50 changes. Magnet 130 has a centrally located opening that is sized to receive shaft portion 116. Any suitable fastening device 132 may be used to retain magnet 130 on shaft portion 116. In an exemplary embodiment, there are a plurality of magnets 130 arranged side-by-side on shaft portion 116. In some embodiments, each magnet 130 is disc-shaped. However, is to be understood that magnet 130 may have other suitable shapes, e.g. cylindrical, sphere, etc. Magnet 130 may be any suitable magnet, including, but not limited to, Neodymium Iron Boron (NdFeB), Samarium Cobalt (SmCo), AlNiCo (Aluminum, Nickle, Cobalt) and Ceramic or Ferrite. Since the bi-directional movement of poppet 108 is linear and the longitudinally extending axis of poppet shaft 115 is substantially coaxial with longitudinally extending axis 84 of sleeve 80, magnet 130 travels along longitudinally extending axis 84 of sleeve 80 as poppet 108 moves toward or away from fluid port 72 of inlet fitting 70. Magnet 130 produces a magnetic field. As magnet 130 moves within interior region 88 of sleeve 80, this magnetic field changes. This changing magnetic field induces an electrical current, known as an Eddy current, in sleeve 80 that produces a magnetic field that opposes the magnetic field of the magnet 130. Therefore, the Eddy currents generate a resistive force in the form of a magnetic field that opposes the magnetic field produced by magnet 130 resulting in damping of the movement of magnet 130. Since magnet 130 is attached to poppet shaft 115, the damping of the movement of magnet 130 results in the damping of the movement of poppet 108. Magnetically damping of the movement of poppet 108 in this manner substantially eliminates instability and chatter during fluctuations of differential pressure across check valve 50 and preserves the lifespan of the components within check valve 50. The resistive force produced by the Eddy currents is proportional to the speed of travel and strength of magnet 130 and the thickness of sleeve 80. The generation of the opposing magnetic field as magnet 130 travels through copper sleeve 80 is based on the scientific principal known as Lenz's Law.

In some embodiments, each magnet 130 is coated or encapsulated with a protective material that will not be adversely affected by the fluid that will flow through check valve 50. Such protective material protects magnet 130 from constant contact with the fluid and from any chemical agents that may be in the fluid.

In an exemplary embodiment, spring member 120 is configured as a compression spring. In another exemplary embodiment, spring member 120 is configured as a helical spring. Spring member 120 may be made from any suitable materials, e.g. high-density steel. In an exemplary embodiment, spring member 120 is fabricated from stainless steel due to the corrosion resistant feature of stainless steel.

The degree of damping of poppet 108 is determined by several factors such as the non-magnetic material from which sleeve 80 is fabricated, the quantity of magnets, the type of magnets and the configuration of spring member 120. Therefore, the degree of damping may be varied to suit a particular application by using a sleeve 80 made from a particular non-magnetic material, and/or varying the quantity of magnets 130 and/or using magnets 130 from a particular material and/or using a spring member 120 having a particular flexibility or stiffness.

Magnetically damping of the motion of the poppet, as described in the foregoing description, is not affected by fluid properties and does not cause wear of components within the check valve. The magnets and the non-magnetic metal sleeve combine to provide resistive forces (i.e. opposing magnetic fields) that increase as the frequency at which the poppet opens and closes increases thereby allowing damping over a wider range of fluid input.

In another embodiment, valve body 52 is fabricated from copper and sleeve 80 is not used. In such an embodiment, the Eddy currents are generated in the copper valve body and produce a magnetic field that opposes the magnetic field generated by the magnet thereby opposing the motion of the magnet and hence, damping the motion of the poppet.

The magnetic damping feature as described in the foregoing description may be applied to other types of components including, but not limited to, pressure regulators, relief valves, shuttle valves and bellows sealed valves.

Figure 5:
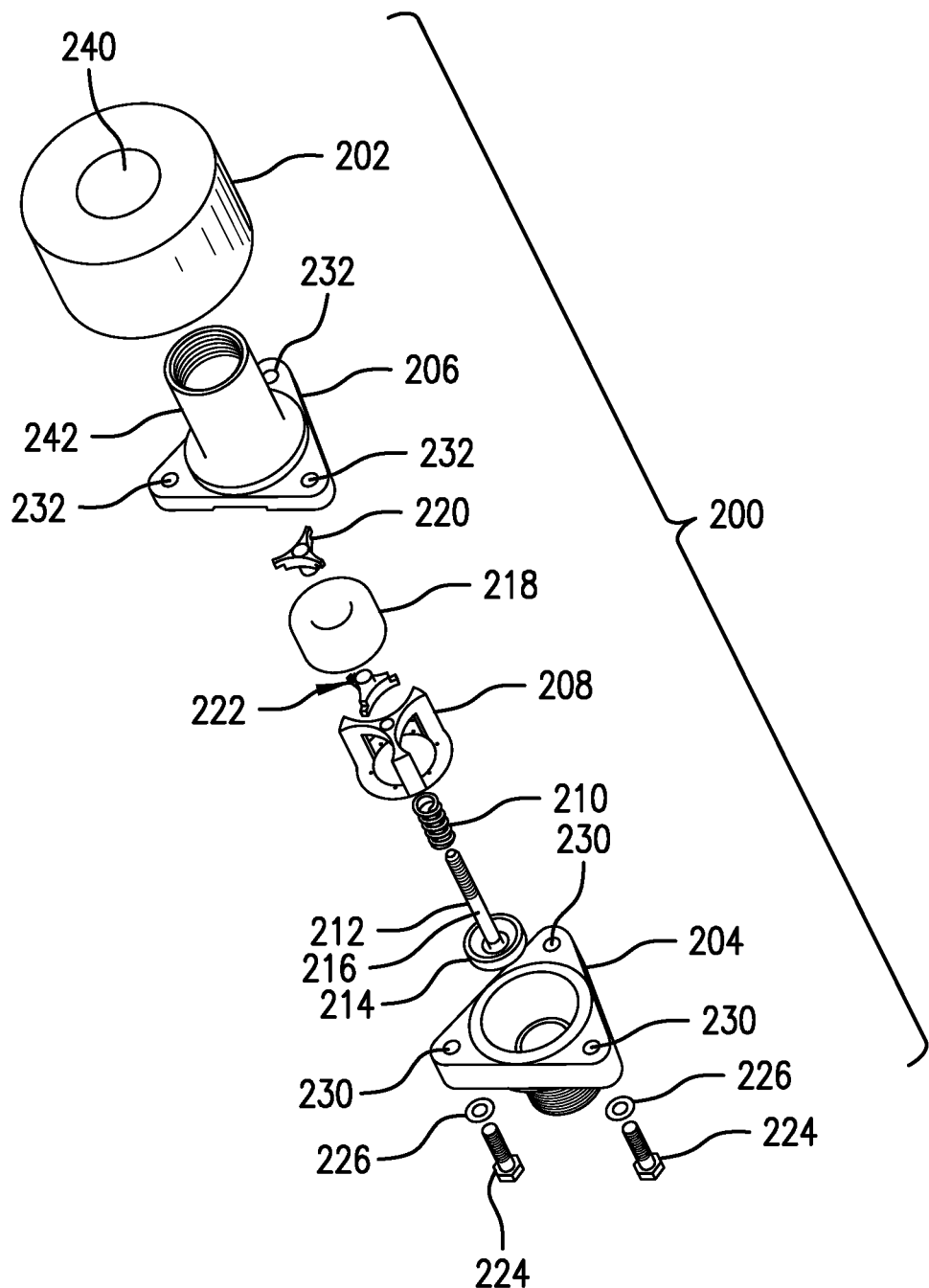
FIG. 5 is an exploded view of a check valve in accordance with another exemplary embodiment.

Referring to FIG. 5, there is shown an exploded view of magnetically damped check valve 200 in accordance with another exemplary embodiment of the present invention. In this embodiment, a non-magnetic metal sleeve or tube 202 is on the exterior of check valve 200 and is therefore not exposed to the fluid flowing through check valve 200. Check valve 200 further comprises inlet body section 204, outlet body section 206 and a magnetically damped poppet system operatively disposed within inlet body section 204 and outlet body section 206. The magnetically damped poppet system comprises poppet cage 208, spring 210 and poppet 212. Poppet 212 includes poppet head 214 and poppet shaft 216 that is attached to poppet head 214. Poppet cage 208 is secured to inlet body section 204 and functions as a guide for poppet 212. Spring 210 functions in the same manner as spring 120 described in the foregoing description. Magnet 218 is attached to poppet shaft 216 via retainers 220 and 222. The entire valve assembly is fastened together via screws or fasteners 224 and washers 226. Screws 224 are inserted through holes 230 in inlet body 204 and threaded to threaded holes 232 in outlet body section 206. Non-magnetic metal tube or sleeve 202 has central, longitudinally extending bore 240 that is sized to receive cylindrical portion 242 of outlet body section 206. This configuration allows sleeve 202 to be slipped over cylindrical portion 242. Any suitable technique may be used to secure or fasten sleeve 202 to cylindrical portion 242. Since sleeve 202 is on the exterior of check valve 200, sleeve 202 will not come into contact with the fluids flowing through check valve 200. In an exemplary embodiment, non-magnetic tube or sleeve is fabricated from copper. In another exemplary embodiment, non-magnetic tube or sleeve is fabricated from aluminum.

Reference in the specification to "an exemplary embodiment", "one embodiment" or "an embodiment" means that a particular feature, structure or characteristic described in connection with the embodiment is included in at least one embodiment of the invention. The appearances of the phrases "an exemplary embodiment", "one embodiment" or "an embodiment" in various places in the specification are not necessarily all referring to the same embodiment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A magnetically damped check valve comprising:
   a valve body having an interior region, an interior wall extending about the interior region and fluid ports in communication with the interior region;
   a non-magnetic metal sleeve disposed within the interior region of the valve body and secured to the interior wall, the sleeve comprising a sleeve wall, an interior region within the sleeve wall and at least one sleeve wall opening in fluid communication with both the interior region of the valve body and the interior region of the sleeve;
   a poppet assembly located within the interior region of the valve body to control the flow of fluids through the check valve, the poppet assembly being operatively supported by the sleeve, the poppet assembly comprising a poppet having a poppet shaft, wherein a portion of the poppet shaft extends into the interior region of the sleeve, the poppet being movable between a first position to prevent fluid flow through the check valve and a second position to allow fluid flow through the check valve, the poppet assembly further comprising a biasing device to constantly urge the poppet to the first position; and
   at least one magnet attached to the portion of the poppet shaft located within the interior region of the sleeve such that the magnet moves with the poppet shaft as the poppet moves in response to changes in the differential pressure across the check valve, wherein the magnet produces a first magnetic field that changes as the magnet moves within the interior region of the sleeve, wherein such changes in the first magnetic field induce an electrical current in the sleeve which produces a second magnetic field that opposes the first magnetic field thereby damping the movement of the magnet and hence, damping the movement of the poppet.

2. The magnetically damped check valve according to claim 1 wherein the sleeve has an end portion and the poppet assembly further comprises a poppet guide member attached to the end portion of the sleeve, wherein the poppet shaft is slidably attached to the poppet guide member.

3. The magnetically damped check valve according to claim 1 wherein the at least one magnet comprises a plurality of magnets arranged side-by-side.

4. The magnetically damped check valve according to claim 1 wherein the non-magnetic metal sleeve is fabricated from a metal chosen from the group consisting of copper and aluminum.

5. A magnetically damped check valve comprising:
   a valve body having an interior region, an interior wall extending about the interior region, a fluid inlet in fluid communication with the interior region for receiving upstream fluids and a fluid outlet for allowing fluids in the interior region to flow downstream;
   a non-magnetic metal sleeve disposed within the interior region of the valve body and secured to the interior wall, the sleeve comprising a sleeve wall, an interior region within the sleeve wall and at least one sleeve wall opening in fluid communication with both the interior region of the valve body and the interior region of the sleeve, the sleeve further comprising a first end that faces the fluid inlet and which has a first opening and an opposite second end that faces the fluid outlet and which has a second opening;
   a poppet assembly located within the interior region of the check valve to control fluid flow through the check valve, the poppet assembly comprising a poppet having a poppet head, a poppet shaft attached to the poppet head and a poppet guide member attached to the first end of the sleeve and wherein the shaft of the poppet is slidably attached to the poppet guide member and the poppet guide member is configured so that a portion of the poppet shaft extends through the first opening in the first end of the sleeve and into the interior region of the sleeve, the poppet being movable between a closed position and an open position, the poppet assembly further comprising a poppet biasing device operatively supported by the poppet guide member to exert a constant force on the poppet so as to constantly urge the poppet to the closed position; and
   at least one magnet attached to the portion of the poppet shaft located within the interior region of the sleeve such that the magnet moves with the poppet shaft as the poppet moves in response to changes in the differential pressure across the check valve, wherein the magnet produces a first magnetic field that changes as the magnet moves within the interior region of the sleeve, wherein such changes in the first magnetic field induce an electrical current in the sleeve which produces a second magnetic field that opposes the first magnetic field thereby damping the movement of the magnet and hence, damping the movement of the poppet.

6. The magnetically damped check valve according to claim 5 wherein the non-magnetic metal sleeve is fabricated from a non-magnetic metal chosen from the group consisting of copper, aluminum and alloys thereof.

7. The magnetically damped check valve according to claim 5 wherein the poppet biasing device comprises a spring interposed between the poppet guide member and the poppet head.

8. The magnetically damped check valve according to claim 7 wherein the poppet guide member includes a stem portion that is disposed within the spring to prevent the spring from being dislodged from the poppet guide member.

9. The magnetically damped check valve according to claim 5 further comprising an inlet fitting attached to the valve body and having a fluid port in fluid communication with the fluid inlet of the valve body, wherein the fluid port defines a seat and the poppet head contacts the seat when the poppet is in the closed position.

10. The magnetically damped check valve according to claim 5 wherein the at least one sleeve wall opening comprises a plurality of equidistantly spaced sleeve wall openings.

11. The magnetically damped check valve according to claim 5 wherein the at least one magnet is substantially circular in shape and has a centrally located opening sized to receive the poppet shaft.

12. The magnetically damped check valve according to claim 5 wherein the at least one magnet comprises a plurality of magnets arranged side-by-side on the poppet shaft.

13. A magnetically damped check valve, comprising:
- a valve body having an interior region, an interior wall extending about the interior region, a fluid inlet in fluid communication with the interior region for receiving upstream fluids and a fluid outlet for allowing fluids in the interior region to flow downstream;
- a non-magnetic metal sleeve disposed within the interior region of the valve body and secured to the interior wall, the sleeve comprising a sleeve wall, an interior region within the sleeve wall and at least one sleeve wall opening in fluid communication with both the interior region of the valve body and the interior region of the sleeve, the sleeve further comprising a first end that faces the fluid inlet and which has a first opening and an opposite second end that faces the fluid outlet and which has a second opening;
- a poppet guide member attached to the first end of the sleeve;
- a poppet having a poppet head and a shaft attached to the poppet head and slidably attached to the poppet guide member, wherein the poppet guide member is configured so that a portion of the shaft extends through the first opening in the first end of the sleeve and into the interior region of the sleeve, the poppet being configured to move between a closed position to prevent fluid flow through the fluid inlet of the valve body and an open position to allow fluid to flow through the fluid inlet and into the interior region of the valve body;
- a biasing device operatively supported by the poppet guide member to exert a constant force on the poppet so as to constantly urge the poppet to the closed position;
- wherein when a differential pressure is created across the check valve that is a result of upstream fluid pressure exceeding downstream fluid pressure, the upstream fluid pressure exerts a force on the poppet head that overcomes the force of the biasing device and pushes the poppet to the open position to allow upstream fluid to flow into the interior region of the valve body and when a differential pressure is created across the check valve that is a result of the downstream fluid pressure exceeding the upstream fluid pressure, the downstream fluid pressure in conjunction with the biasing device moves the poppet back to the closed position; and
- at least one magnet attached to the portion of the shaft located within the interior region of the sleeve such that the magnet moves within the interior region of the sleeve as the poppet moves in response to changes in the differential pressure across the check valve, wherein the magnet produces a first magnetic field that changes as the magnet moves within the interior region of the sleeve and wherein such changes in the first magnetic field induce an electrical current in the sleeve which produces a second magnetic field that opposes the first magnetic field thereby damping the movement of the magnet and hence, damping the movement of the poppet.

14. The magnetically damped check valve according to claim 13 wherein the poppet guide member has a longitudinally extending passage that is in communication with the first opening in the first end of the sleeve.

15. The magnetically damped check valve according to claim 14 wherein the sleeve has a longitudinally extending axis and the longitudinally extending passage in the poppet guide member is substantially coaxial with the longitudinally extending axis of the sleeve.

16. The magnetically damped check valve according to claim 13 wherein the biasing device comprises a spring interposed between the poppet guide member and the poppet head.

17. The magnetically damped check valve according to claim 16 wherein the poppet guide member includes a stem portion that is disposed within the spring to prevent the spring from being dislodged from the poppet guide member.

18. The magnetically damped check valve according to claim 13 further comprising an inlet fitting attached to the valve body and having a fluid port in fluid communication with the fluid inlet of the valve body, wherein the fluid port defines a seat and the popper head contact the seat when the poppet is in the closed position.

19. The magnetically damped check valve according to claim 13 wherein the valve body has a longitudinally extending axis and the sleeve has a longitudinally extending axis that is substantially coaxial with the longitudinally extending axis of the valve body.

20. The magnetically damped check valve according to claim 13 wherein the sleeve is attached to the interior wall of the valve body.

21. The magnetically damped check valve according to claim 13 wherein the non-magnetic metal sleeve is fabricated from a non-magnetic metal chosen from the group consisting of copper, aluminum, zinc, tin, lead, chrome and alloys thereof.

22. The magnetically damped check valve according to claim 13 wherein the at least one sleeve wall opening comprises a plurality of equidistantly spaced sleeve wall openings.

23. The magnetically damped check valve according to claim 13 wherein the at least one magnet is substantially circular in shape and has a centrally located opening sized to receive the poppet shaft.

24. The magnetically damped check valve according to claim 13 wherein the at least one magnet comprises a plurality of magnets arranged side-by-side on the poppet shaft.

25. A magnetically damped check valve comprising:
- a non-magnetic metal sleeve having an interior region;

a check valve having a portion thereof disposed within the interior region of the sleeve, the check valve having an interior region, an interior wall extending about the interior region, a fluid inlet in fluid communication with the interior region for receiving upstream fluids and a fluid outlet for allowing fluids in the interior region to flow downstream;

a poppet assembly located within the interior region of the check valve to control fluid flow through the check valve, the poppet assembly comprising a poppet having a poppet head, a poppet shaft attached to the poppet head and a poppet cage that is secured within the interior region of the check valve, wherein the shaft of the poppet is slidably engaged to the poppet cage and wherein the poppet is movable between a closed position and an open position, the poppet assembly further comprising a biasing device operatively supported by the poppet cage to exert a constant force on the poppet so as to constantly urge the poppet to the closed position; and at least one magnet attached to the poppet shaft such that the magnet moves with the poppet shaft as the poppet moves in response to changes in the differential pressure across the check valve, wherein the magnet produces a first magnetic field that changes as the magnet moves within the interior region of the check valve wherein such changes in the first magnetic field induce an electrical current in the sleeve which produces a second magnetic field that opposes the first magnetic field thereby damping the movement of the magnet and hence, damping the movement of the poppet.

26. The magnetically damped check valve according to claim 25 wherein the non-magnetic metal sleeve is fabricated from a non-magnetic metal chosen from the group consisting of copper, aluminum and alloys thereof.

27. The magnetically damped check valve according to claim 25 wherein the at least one magnet is substantially disk-shaped and has a centrally located opening sized to receive the poppet shaft.

28. The magnetically damped check valve according to claim 25 wherein the at least one magnet comprises a plurality of magnets arranged side-by-side on the poppet shaft.

* * * * *